Figure 1A:
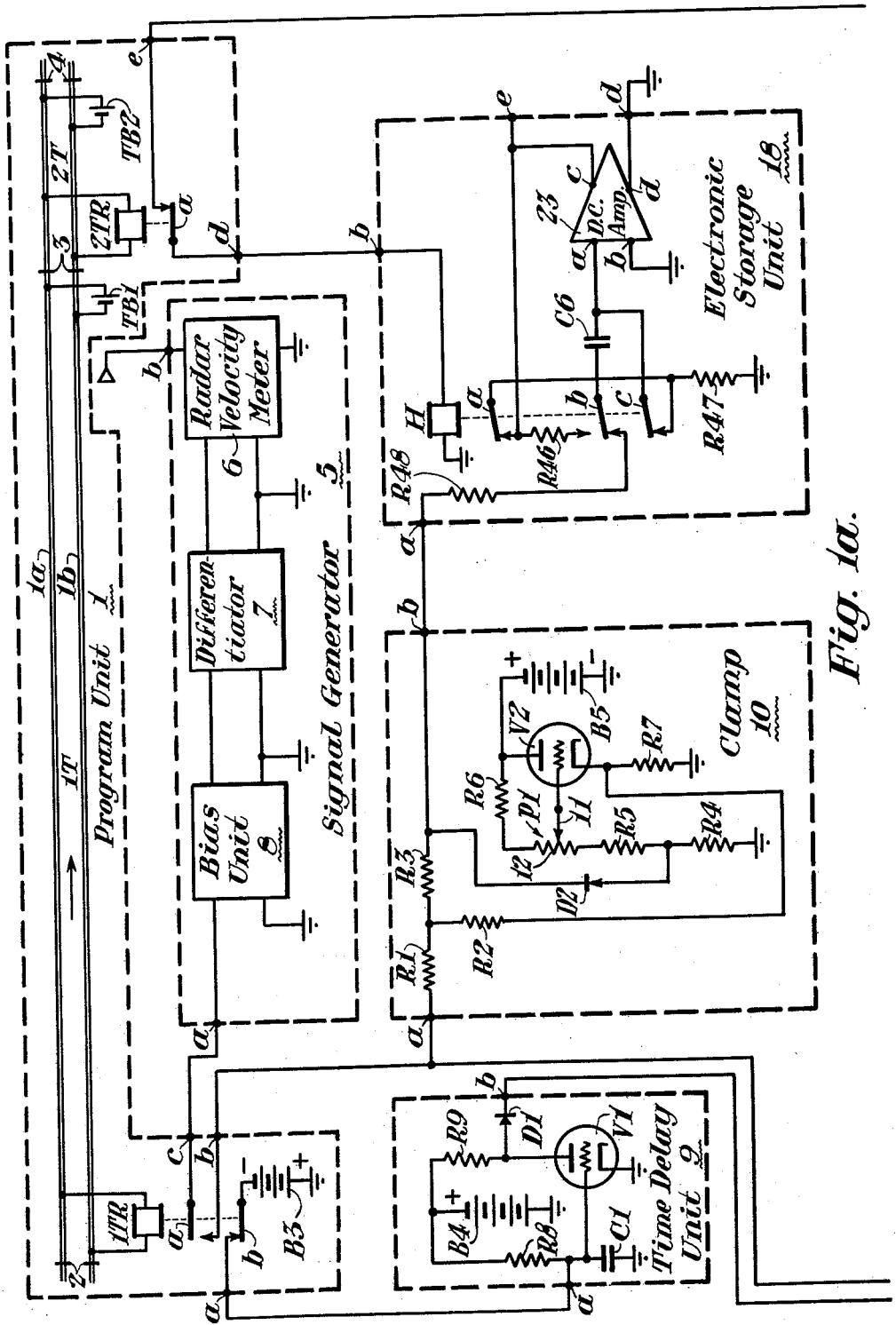

May 28, 1963  J. A. COOK, JR  3,091,688
VALIDITY DETECTOR
Filed April 27, 1959  3 Sheets-Sheet 2

INVENTOR.
James A. Cook Jr.
BY
W L Stout
HIS ATTORNEY

May 28, 1963  J. A. COOK, JR  3,091,688
VALIDITY DETECTOR
Filed April 27, 1959  3 Sheets-Sheet 3

INVENTOR.
James A. Cook Jr.
BY
W L Stat
HIS ATTORNEY

United States Patent Office 3,091,688
Patented May 28, 1963

3,091,688
VALIDITY DETECTOR
James A. Cook, Jr., Wilkinsburg, Pa., assignor to Westinghouse Air Brake Company, Wilmerding, Pa., a corporation of Pennsylvania
Filed Apr. 27, 1959, Ser. No. 809,191
11 Claims. (Cl. 246—182)

My invention relates to information processing apparatus, and particularly to an improved validity detector for evaluating the integrity of an information signal.

In many control and computing systems, input signals are supplied in accordance with measurements continuously or intermittently made on variables influencing the operation of the system. In general, it is known in advance that the magnitude, for example, of a given signal will be within a prescribed range if the signal accurately represents a permissible value of the corresponding variable. When such a signal departs from the prescribed range, the resulting operation of the system may be assumed to be erroneous or invalid. Accordingly, it would be desirable to preclude the admission of such erroneous signals to the system. It is an object of my invention to provide a validity detector for evaluating a signal in accordance with predetermined criteria and applying the signal to a system only if its characteristics meet the criteria.

As one specific example, in automatic classification yards for railway cars it is desirable to measure the rolling resistance of each car entering the yard so that retarders in the yard may be set to properly control the speed of the cars in their routes to selected classification tracks. For example, one such automatic classification yard control system is shown and described in the copending application of David P. Fitzsimmons and William A. Robison, Jr., Serial No. 676,730, filed August 7, 1957, and assigned to the assignee of my present application.

In such a system, it is possible to handle some cars using average values of rolling resistance, rather than measured values, if enough actual measured values are available for other cars. In general, the observed rolling resistance of cars in a particular yard will fall within a predetermined range, for example, between 0 and 20 pounds per ton. Accordingly, where apparatus is provided for measuring the rolling resistance of each car in such a yard, the measured value may be considered to be invalid if it is beyond the predetermined range. It is a particular object of my invention to provide means for detecting excursions of a rolling resistance signal beyond such a predetermined range.

In some cars, such as partly loaded tank cars, fluctuation of the lading may cause the observed rolling resistance of the car to fluctuate in a random manner. Obviously, a measurement of the rolling resistance at any given time of such a car would generally be meaningless. Accordingly, it is a further and more particular object of my invention to provide a validity detector for checking the output stability of a rolling resistance measuring system in an automatic classification yard.

It is a further object of my invention to provide a validity detector for checking that the measured value of a signal is within prescribed limits.

It is a further object of my invention to provide a validity detector for checking that the rate of change of a signal is within prescribed limits.

It is a further object of my invention to provide means for checking that the magnitude and the rate of change of a signal are within prescribed limits and means for applying the signal to a signal storage device if the signal is within the prescribed limits.

In practicing my invention, in accordance with one specific embodiment thereof, a validity detector is connected to the output of a rolling resistance measuring system located on a stretch of measuring track in a classification yard. In the validity detector, I provide means for supplying the output of the rolling resistance measuring unit to a storage unit only if the measured value is below a predetermined limit. In this embodiment, the storage unit is of the type in which a signal may be applied and followed for a period of time, and then stored by the operation of a holding relay. The validity detector also includes a first time delay unit for delaying the storage of the signal for a predetermined time after the rolling resistance measuring apparatus has been energized, means for detecting whether the rolling resistance is above a predetermined maximum value, and means for detecting whether the measured value is below a predetermined minimum value. In order to determine that the measured value is a stable equilibrium value, I provide means for measuring the rate of change of the rolling resistance signal, and means for detecting excursions of this rate of change beyond predetermined limits. I further provide a second time delay unit which is actuated only after the predetermined time determined by the first time delay unit, and then only if both the magnitude of the measured value and the rate of change of the measured value are within prescribed limits. A switching unit is provided for actuating the storage relay of the signal storage unit. The switching unit is actuated by the second time delay unit after its time delay if all the previous conditions for validity of the signal have been fulfilled.

The details of the above-described embodiment of my invention, as well as other objects, features and advantages of my invention, will appear from a study of the accompanying drawings in connection with the detailed description hereinafter given.

I shall first describe one embodiment of my invention in detail, and shall then point out the novel features thereof in claims.

Figure 1B:
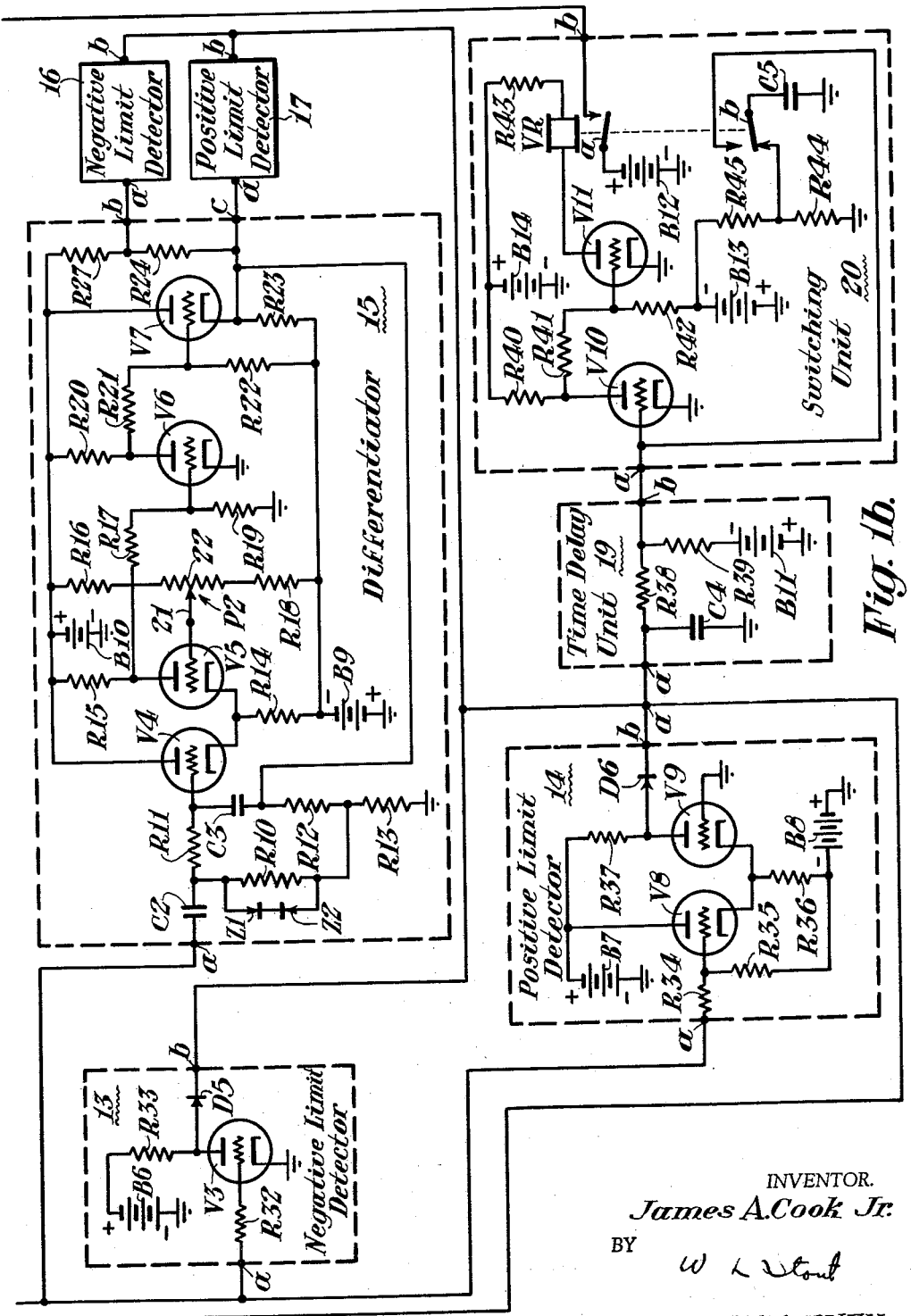

In the drawings,

FIGS. 1a and 1b, when placed horizontally one above the other with FIG. 1a at the top, comprise a wiring diagram of one embodiment of my invention.

Figure 2:
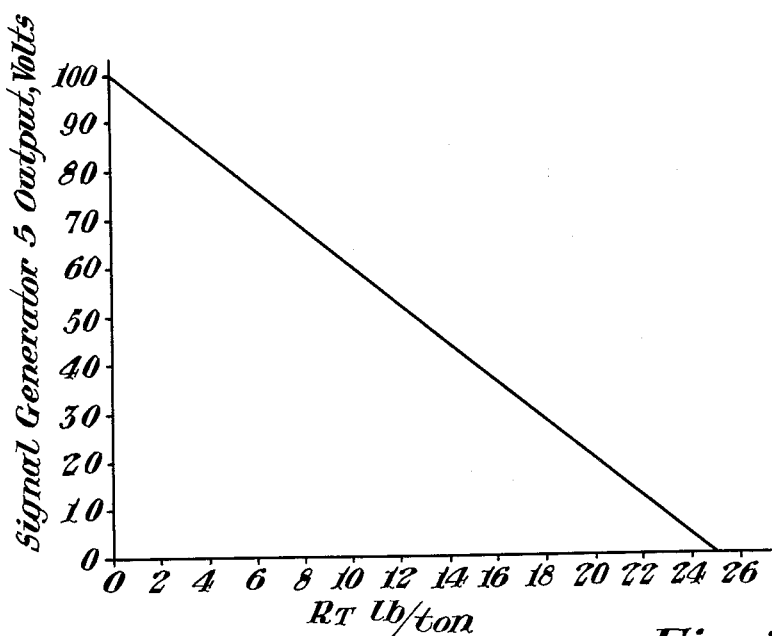
Figure 3:
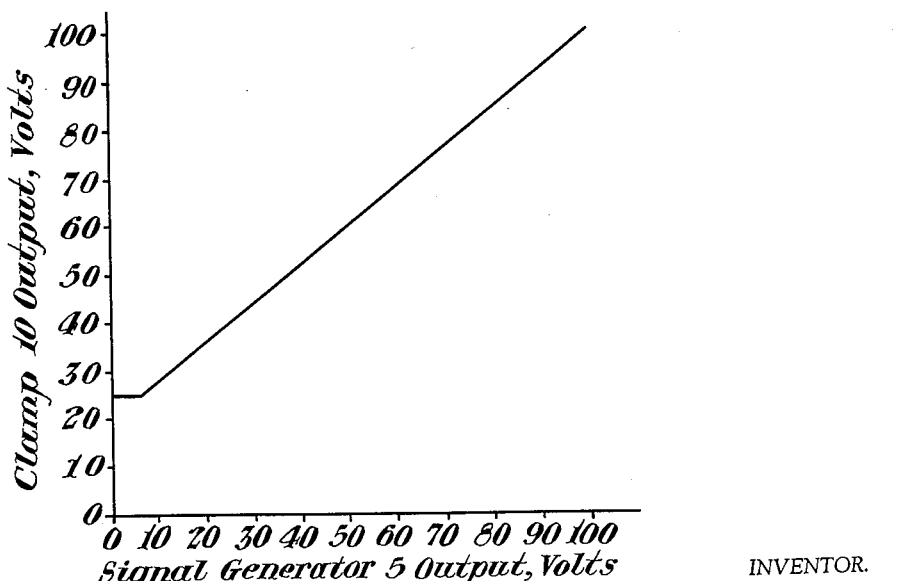

FIGS. 2 and 3 graphically illustrate the output voltage of signal generator 5 versus rolling resistance in pounds per ton and the output voltage of clamp 10, respectively.

Referring now to the drawings I have shown a stretch of track comprising rails 1a and 1b over which cuts of one or more cars are assumed to move in the direction shown by the arrow. This stretch of track is assumed to be located in a classification yard provided with an automatic control system, which may, for example, be of the type shown and described in detail in the abovementioned application Serial No. 676,730. The stretch of track is divided, as shown, as by insulated joints 2, 3 and 4, into first and second track sections 1T and 2T, respectively. As shown, track section 1T may form a part of a conventional track circuit comprising the rails of the section, a track battery TB1 and a normally energized track relay 1TR. Track section 2T may form part of a conventional track circuit comprising the rails of the section, a track battery TB2 and a normally energized track relay 2TR. Accordingly, the occupancy of each of track sections 1T and 2T will be indicated by the release of the corresponding track relay in response to the shunting of the track rails by the wheels and axles of a car occupying the section.

The apparatus just described, and certain contacts of the track relays, to be described, are shown in the drawings surrounded by a dotted line and designated as a program unit 1. The function of this unit is to program, or time, a measurement of rolling resistance of a cut of cars, in the manner described in the above-cited application Serial No. 676,730 by marking the beginning and end of a measuring period. However, as will appear, any other suitable program unit for timing a measurement could be employed if so desired, without departing from the scope of my invention.

As described in the above-mentioned copending application Serial No. 676,730, and shown, for example, in FIG. 7 thereof, and as more particularly described in detail in the copending application of Emil F. Brinker, Serial No. 727,388, filed April 9, 1958, for Measuring Apparatus, and assigned to the assignee of my present application, the rolling resistance of cuts of one or more cars rolling in track section 1T may be measured by a signal generator 5 comprising a radar velocity meter 6, a differentiator 7, and a bias unit 8. Since this apparatus is described in detail in the above-mentioned copending applications, it will not be fully described here. Briefly, however, the radar velocity meter 6 measures the speed of a car in section 1T and provides a signal which is differentiated by differentiator 7 to provide a signal in accordance with the acceleration of the cut. This signal is offset in bias unit 8, from a maximum of 100 volts, in accordance with the value of the signal and a calibration factor proportional to the grade of the measuring section, in a manner fully described in detail in the above-mentioned copending applications. For present purposes, it is sufficient to note merely that the output of the bias unit is a D.C. voltage signal following a straight-line functional relationship between a maximum value of 100 volts when the measured rolling resistance is 0 and a value of 0 volt when the measured rolling resistance is 25 pounds per ton. It should also be pointed out that, in the broader aspects of my invention, the output of any signal generator having a predetermined output characteristic could be checked in the manner to be described.

As described in detail in the above-noted copending application Serial No. 676,730, the rolling resistance measured by the radar accelerometer may be stored in an electronic storage unit of the type shown at 18 in FIG. 1a. Unit 18 will be seen to correspond to unit 1–2GR1–ESU in FIG. 45 of application Serial No. 676,730. The details of such a storage unit are fully described in my copending application Serial No. 634,000 for Electronic Storage Device, filed January 14, 1957, now Patent No. 2,914,750, and assigned to the assignee of my present application. Broadly, however, as shown, electronic storage unit 18 comprises a D.C. amplifier 23 having an input between terminal $a$ and ground and an output between terminal $c$ and grounded terminal $d$.

As described in copending application Serial No. 634,000, the input signal to be stored is applied to terminal $a$ of storage unit 18, and thence through a resistor R48, the back point of contact $b$ of relay H, capacitor C6, back contact $c$ of relay H and through resistor R47 to ground. In the condition shown, output terminal $c$ of amplifier 23 is connected over back contact $a$ of relay H and through resistor R47 to ground to provide a first feedback circuit to the amplifier. Resistor R47 is thus connected in shunt within the input and output circuits of the amplifier. With relay H de-energized, the applied signal causes current to flow through resistor R48, capacitor C6 and resistor R47 in series. While the capacitor is charged, the input and output circuits of amplifier 23 are connected together and shunted by resistor R47. Accordingly, a voltage will be developed at the output of the amplifier in accordance with the internal characteristics of the amplifier. This voltage will appear across resistor R47. The polarity of this voltage may be equal or opposite to that provided by the applied signal. If the voltages are opposite in polarity, capacitor C6 will be charged to a voltage equal to the difference between the applied signal voltage and the voltage developed by the amplifier across resistor R47. If the voltages are of the same polarity, the capacitor will be charged to voltage equal to the sum of the applied signal and the voltage across resistor R47. In either event, the capacitor is charged to a voltage which differs from the voltage applied to terminal $a$ of unit 18 by the voltage developed across resistor R47.

The circuit constants are so chosen that capacitor C6 is charged rapidly. When relay H is energized, the connection between the amplifier output circuit and the input circuit is interrupted at the open back point of contact $a$ of relay H. The circuit for resistor R47 is now opened at the open back point of contact $c$ of relay H. The applied signal is now disconnected at the open back point of contact $b$ of relay H. The closing of the front point of contact $b$ of relay H now connects a resistor R46 in series with capacitor C6 in a feed-back path between input terminal $a$ and output terminal $c$ of amplifier 23. A high value is chosen for resistor R46, and since the amplifier is arranged to have negligible current flowing in the input circuit, capacitor C6 retains its charge for a relatively long period of time, during which the stored value of the applied signal is available between terminal $c$ and grounded terminal $d$ of electronic storage unit 18.

As described in copending application Serial No. 676,730, a series of electronic storage units such as 18 may be provided, and switching apparatus may be provided for connecting the rolling resistance signal to the first one of these units in the series that happens to be available, thus permitting the simultaneous storage of several values of rolling resistance for different cars. Obviously, such provision could be made in the illustrated embodiment, but since this additional apparatus forms no part of my present invention, it has not been shown. Further, it will be appreciated that the details of the storage unit do not form a part of my invention, and that any desired storage unit or other utilization device could be employed if so desired.

The apparatus above briefly described is typical of that with which my invention is adapted to be employed. The manner in which the voltage detector of my invention is constructed and connected to cooperate with the previously described apparatus will next be described.

As shown, in addition to the previously described apparatus, I have provided a first form of time delay unit 9, a clamp 10, a differentiator 15, first and second negative limit detectors 13 and 16, first and second positive limit detectors 14 and 17, a second form of time delay unit 19, and a switching unit 20. The details of each of these units will first be described, and their connections to form a validity detection system will then be described.

Delay unit 9 is adapted to provide a signal after a first predetermined delay time, which may be, to give one practical example, three seconds. This unit includes a capacitor C1, which is initially charged negatively from a battery B3 in program unit 1 over front contact $b$ of track relay 1TR. Thus, capacitor C1 is charged negatively as long as track section 1T is unoccupied. One end of capacitor C1 is grounded, as shown, and the other end is connected to the grid of a triode V1 having a grounded cathode. The grid of triode V1 is also connected, through a resistor R8, to the positive terminal of a suitable source of potential such as a battery B4. The plate of triode V1 is connected to the positive terminal of battery B4 through a suitable resistor R9. A diode D1 is connected to the plate of triode V1 as shown.

Normally, with track relay 1TR in the condition shown, and capacitor C1 negatively charged to the potential of battery B3, tube V1 will be cut off and the plate of triode V1 will be at the potential of battery B4. Diode D1 will accordingly conduct as long as output terminal $b$ of unit 9 is below the potential of battery B4. When track section 1T is occupied, causing track relay 1TR to release, the charging circuit for capacitor C1 will be interrupted at the open front point of contact b of relay 1TR, and capacitor C1 will discharge through resistor R8. In the embodiment shown, the value of C1 may be approximately .5 microfarad and the value of resistor R8 may be 20 megohms. Battery B3 may have a potential of 100 volts, battery B4 may have a potential of 300 volts, and resistor R9 may be 100,000 ohms. Triode V1 may be one-half of a type 6201 tube, and diode D1 may be a 1N540. With these components and constants, after approximately three seconds capacitor C1 will have discharged to an equilibrium value such that, taking into account the effects of grid current which will prevent the grid from reaching the full potential of battery B4, conduction of tube V1 will bring the plate potential to 150 volts. Accordingly, diode D1 will not conduct unless output terminal b of the time delay unit is below 150 volts. The utility of time delay unit 9 will be made apparent below.

Clamp 10 is inserted between the output of signal generator 5 and the input of storage unit 18 to prevent the transmission of an output voltage below a predetermined value, which may be 26 volts in the embodiment shown, and which corresponds to a maximum transmitted value of rolling resistance of approximately 18.6 pounds per ton, it being presumed that any higher value would be spurious. As shown, clamp 10 includes a triode V2, having its plate connected to the positive terminal of a suitable source of potential, such as battery B5, and its cathode connected to ground through a resistor R7. A voltage divider comprising a first resistor R6, the resistance element 12 of a potentiometer P1, and two resistors R5 and R4 are connected in series between the positive terminal of battery B5 and ground.

The wiper 11 of potentiometer P1 is connected to the grid of triode V2, and is adjusted so that the voltage at the cathode of triode V2 is a suitable constant, which may be 100 volts in the embodiment shown. This cathode voltage is coupled through a resistor R2 to the junction of two resistors R1 and R3, as shown. The other terminal of resistor R1 is connected to output terminal a of signal generator 5 over the back point of contact a of track relay 1TR. The other terminal of resistor R3 is connected to input terminal a of electronic storage unit 18. A diode D2 is connected between the junction of resistors R4 and R5 and the output terminal of resistor R3, as shown.

In one embodiment of my invention, the value of resistor R6 is 100K, resistor 12 is 10K, resistor R5 is 27K and resistor R4 is 13K, where K stands for 1000 ohms. Accordingly, in this embodiment the voltage across resistor R4 is approximately 26 volts. Resistor R1 may be 200K, resistor R2 may be 800K, resistor R3 may be 330K and resistor R7 may be 47K. The reason for the values of these constants will appear. The diode D2 may be a 1N540, battery B5 may be 300 volts, and triode V2 may comprise the other half of the type 6201 tube used for V1 in unit 9.

Referring now to FIG. 2, it will be seen that the output of signal generator 5 is a negative-going positive voltage having a maximum value of 100 volts, corresponding to 0 pound per ton of rolling resistance, and a minimum value of 0 volt, corresponding to a measured value of 25 pounds per ton. Should other voltages appear in the output, they would be assumed to be due to an invalid measurement or to faulty operation of the equipment.

In the operation of automatic classification yards, it may be observed that better performance of the system is obtained if the values of rolling resistance measured in the measuring section are corrected by a factor depending on the layout and operating characteristics of the yard before applying them to predict the performance of cars in the classification tracks. In the present example, it is assumed that the final value may be taken as a percentage of the measured value. In the embodiment shown, 80 percent of the measured value is transmitted to represent a typical correlation. In addition, it will be assumed that any measured value of rolling resistance above about 18.6 pounds per ton, corresponding to a signal generator output voltage of about 26 volts, is unrealistically high. In view of these considerations, it is desired to modify the output of signal generator 5 as shown in FIG. 3, such that the output of clamp 10 in response to a signal from signal generator 5 will never be less than 26 volts nor more than 100 volts, and above 26 volts will bear a linear relationship to the signal generator output such that the clamp output will be approximately 80 percent of the rolling resistance represented by the signal generator output in this range. The manner in which the clamp functions to give the characteristic shown in FIG. 3 will now be described.

Referring now to FIG. 1a, with the values given, the voltage across resistor R4 will be about 26 volts. Thus, due to the operation of diode D2, if the potential at output terminal b of clamp 10 tends to fall below 26 volts, diode D2 will conduct to maintain it at 26 volts. Above 26 volts, diode D2 acts as an open circuit. In this condition, the voltage at output terminal b is determined by the ratio of resistances R1 and R2 and the difference between the signal generator output applied to terminal a of clamp 10 and the cathode potential of triode V2, which is 100 volts in the example given. If resistor R1 is 200K and resistor R2 is 800K, as stated above, the voltage at output terminal b of clamp 10 will be the voltage at input terminal a plus 20 percent of the difference between 100 and the voltage at terminal a. It will be apparent that this relationship will lead to the output characteristic curve shown in FIG. 3. As shown, the output is directly applied to input terminal a of storage unit 18, but the storage will not be completed until relay H of storage unit 18 is energized in a manner which will subsequently be described.

Referring now to FIG. 1b, negative limit detector 13 comprises a triode V3, a diode D5, an input resistor R32, a plate resistor R33, and a suitable source of plate potential such as a battery B6. In the embodiment shown, triode V3 may be half of a 6201 tube, D5 may be a 1N540, R32 may be a 4.7 megohm resistor, R33 may be a 100K resistor, and battery B6 may be any suitable 300 volt source.

For voltages above approximately −6 volts applied through resistor R32 to the grid of triode V3, conduction in triode V3 will lower the plate potential to 150 volts or below. However, if the input voltage is below −6 volts, the triode will be cut off and the plate potential will rise to the potential of battery B6, or to 300 volts in the embodiment shown. Thus diode D5 will clamp output terminal b of negative limit detector 13 to a minimum of 150 volts for input voltages above −6 volts, and will clamp terminal b to a minimum of 300 volts for inputs to triode V3 below −6 volts. The utility of this unit will become apparent hereinafter.

A second negative limit detector 16 in FIG. 1b may correspond structurally to limit detector 13. However, for reasons that will appear, it is desired that limit detector 16 function at −16 volts instead of −6 volts. For this purpose, the resistor in limit detector 16 which corresponds to resistor R32 in detector 13 may be 1 megohm, and the resistor that corresponds to resistor R33 may by 100K. Otherwise, the structure and operation of the two units are identical.

Positive limit detector 14 in FIG. 1b is somewhat similar in principle to the negative limit detectors described above, but includes a phase inverter so that the output clamp value is transformed for excursions above a positive limit rather than below a negative limit. As shown, positive limit detector 14 includes a first triode V8 having its plate directly connected to the positive terminal of a suitable source of potential, here shown as a battery B7, which has its negative terminal grounded as shown. The cathode of triode V8 is connected to ground through a cathode resistor R36 and a second source of potential such as a battery B8 having its positive terminal connected to ground as shown. The grid of triode V8 is coupled to the negative terminal of battery B8 through a resistor R35. A second triode V9 in limit detector 14 has its grid grounded, as shown, and its cathode directly connected to the cathode of tube V8 so that the cathode circuit comprising resistor R36 and battery B8 is common to both triodes. The plate of triode V9 is connected through a plate resistor R37 to the positive terminal of battery B7, and is connected through a diode D6 to output terminal b of detector 14.

In the embodiment shown, triodes V8 and V9 may both be enclosed in a type 6201 envelope, diode D6 may be a 1N540, batteries B7 and B8 may each be 300 volts, resistor R35 may be 2 megohms, resistor R34 may be 750K, resistor R36 may be 130K and resistor R37 may be 100K. With these values, triode V9 will normally be conducting and the plate voltage will be 150 volts or below. The cathode voltage developed across resistor R36 will tend to limit conduction in triode V8. When a positive-going signal is applied to input terminal a, a voltage will appear at the grid of tube V8 tending to increase conduction in that triode. The increased current through triode V8 flowing through resistor R36 will raise the cathode potential of both triodes. When the signal applied between terminal a and ground exceeds a predetermined value, which will be 100 volts in the embodiment shown, the current through triode V8 will be large enough to raise the cathode potential sufficiently to cut off triode V9 and the plate potential of triode V9 will then increase to 300 volts. Thus, output terminal b of detector 14 is clamped to a minimum of 150 volts when the signal applied to terminal a is below 100 volts, and to a minimum of 300 volts when the input is above 100 volts. Should the voltage at output terminal b tend to go below the clamped level in either case, diode D6 will conduct to restore the voltage to the clamped level. (Of course, there is nothing to prevent the voltage at terminal b from being raised above the clamped value in either case.) The utility of unit 14 will appear as the description proceeds.

Positive limit detector 17 in FIG. 1b may correspond in structure and operation to positive limit detector 14, except that, for reasons to appear, it is desired that limit detector 17 function at +16 volts, rather than at +100 volts. For this purpose, with the other components having the same values, the resistors in positive limit detector 17 corresponding to resistors R34, R35, R36 and R37 may be 120K, 1.5 megohms, 120K and 100K, respectively. Otherwise the structure and operation are identical to those of limit detector 14. The utility of limit detector 17 will hereinafter appear.

Differentiator 15 is provided in order to measure the rate of change of the output of signal generator 5. This unit comprises triodes V4, V5, V6 and V7, a pair of Zener diodes Z1 and Z2, a potentiometer P2, a suitable source of positive potential such as a battery B10, a suitable source of negative potential such as a battery B9, and various resistors and capacitors, to be described.

The input stage of differentiator 15 comprises triode V4 and its attendant circuitry. Triode V4 has its plate connected to the positive terminal of battery B10, and its cathode connected to the negative terminal of battery B9 through a suitable cathode resistor R14. The basic input circuit for the grid of triode V4 comprises capacitor C2, resistor R10 and resistor R13 in series. The function of capacitor C2 is to transmit only the rate of change of an input signal applied between terminal a and ground to the grid of triode V4. A voltage proportional to the rate of change will appear across resistors R10 and R13 in series, and will be coupled to the grid of triode V4 through resistor R11.

Zener diodes Z1 and Z2 are connected back-to-back across resistor R10, as shown. As is known in the art, these diodes have the property of blocking current flow in the reverse direction for applied voltages up to a predetermined value, and thereafter going to a low impedance state in which they act as conductors. The purpose of these units is to limit the measured rate of change of the rolling resistance signal to values of less than +10 volts and more than −10 volts, since restriction to this range simplifies the remaining circuits, and because it would serve no useful purpose to transmit greater variations.

Resistor R12 and capacitor C3 are included in a degenerative feed-back circuit, to be described.

The second stage of differentiator 15 comprises triode V5 and its associated circuits. Triodes V4 and V5 have a common cathode circuit comprising resistor R14 and battery B9. The plate of triode V5 is connected to the positive terminal of battery B10 through a plate resistor R15.

Grid bias for triode V5 is obtained from a potential divider extending from the positive terminal of battery B10 through a resistor R16, the resistive element 22 of a potentiometer P2, and a resistor R18 in series to the negative terminal of battery B9. The wiper 21 of potentiometer P2 is directly connected to the grid of triode V5 as shown. Wiper 21 is so adjusted on potentiometer P2 that variations in the cathode voltage across resistor R14 caused by signals applied to the grid of triode V4 will cause a proportionate change in the current flow through triode V5 and a corresponding variation in the plate potential of triode V5. In particular, if the signal on the grid of triode V4 increases in a positive direction, the current through diode V4 will increase and the cathode voltage will increase correspondingly. This increased cathode voltage applied to triode V5 will decrease the current flow through plate resistor R15 and triode V5 and the voltage at the plate of triode V5 will increase.

The output appearing at the plate of triode V5 is resistance-coupled to the grid of a third stage triode amplifier V6 by means of a series potential divider comprising resistors R17 and R19. The plate of triode V6 is connected to positive terminal of battery B10 through a suitable plate resistor R20 and the cathode is grounded as shown. Triode V6 accordingly operates as a conventional amplifier, with a negative going signal applied to the grid causing a rise in the voltage at the plate.

The last stage of differentiator 15 comprises triode V7 and its associated circuits. The plate of the previous stage triode V6 is coupled to the grid of triode V7 through a potential divider comprising resistor R21 and resistor R22, the latter being connected through battery B9 to ground. The cathode of triode V7 is coupled to the negative terminal of battery B9 by a suitable cathode resistor R23. The plate of triode V7 is directly connected to the positive terminal of battery B10, as shown.

A series potential divider extends from the positive terminal of battery B10 through resistors R27, R24 and R23 in series to the negative terminal of battery B9. As shown, a first output terminal b of the differentiator is connected to the junction of resistors R24 and R27, and a second output terminal c is connected to the junction of resistors R23 and R24. When a signal is applied to the grid of triode V7, variations in cathode current cause fluctuations in the voltage across resistor R23 which are directly reflected at output terminals b and c.

The voltage at the cathode of triode V7 is fed back to the input of triode V4, high frequency components of the output being directly coupled to the grid of triode V4 through capacitor C3, and lower frequency components being returned to ground through resistors R12 and R13. While a small portion of the lower frequency components are coupled to the grid through resistors R10 and R11, the over-all function of this feed-back network is to attenuate high frequency components more than low frequency components, thus filtering out random noise in the input signal. Such noise is normally of a substantially higher frequency than the rate of change of the signal which is sought to be measured.

It will be observed from the above description that the stage comprising triode V4 is cathode coupled to the second stage in such a manner that there is no inversion between the signal at the grid of triode V4 and the output at the plate of triode V5. Since triode V7 is a cathode follower, there is no inversion in that stage, and since there is a single phase inversion in triode V6, the output of the differentiator is phase inverted. Thus, the feedback just described is degenerative in nature. The over-all operation of the differentiator will accordingly be seen to produce signals at the output terminals $b$ and $c$ proportional to the rate of change of the signal applied to input terminal $a$, with high frequency noise filtered out, and with variations in the input rate of change limited by the action of Zener diodes Z1 and Z2.

In the above-described differentiator of this embodiment, triodes V4 and V5 may comprise a single 5751 tube, triodes V6 and V7 may comprise a single 5814WA tube, and Z1 and Z2 may each be a 10 voltage Zener diode. Batteries B9 and B10 may each be 300 volts. Capacitor C2 may be .25 microfarad and capacitor C3 may be .004 microfarad. Resistor R10 may be 10 megohms, resistor R11 may be 270K, resistor R12 may be 300K, resistor R13 may be 100K, resistors R14, R15, R16 and R18 may each be 220K, resistor 17 may be 2.2 megohms, potentiometer P2 may be 25K, resistor R19 may be 3.3 megohms, resistor R20 may be 100K, resistor R21 may be 1.8 megohms, resistor R22 may be 3.3 megohms, resistor R23 may be 68K, resistor R24 may be 120K, and resistor R27 may be 1 megohm.

Time delay unit 19 comprises a capacitor C4 having one end connected to ground and the other end connected through resistors R38 and R39 in series to the negative terminal of a battery B11, which has its positive terminal grounded as shown. In the embodiment shown, capacitor C4 may be .15 microfarad, resistor R38 may be 4.7 megohms, and resistor R39 may be 10 megohms. With these constants, an input signal applied to input terminal $a$ of unit 19 will be transmitted to output terminal $b$ with a time delay of approximately .7 second.

Switching unit 20 comprises a first triode V10, a second triode V11, a direct current relay VR, and associated circuits which will now be described. Triode V10 has its cathode connected to ground as shown, and its plate connected to the positive terminal of a suitable source of potential, here shown as a battery B14, through a suitable plate resistor R40. The negative terminal of battery B14 is grounded. Normally, a relatively high voltage is applied to the grid of triode V10 of switching unit 20 in a manner to be described. A substantial current will accordingly flow through plate resistor R40, driving the plate to a relatively low potential. If the signal applied to input terminal $a$ becomes sufficiently negative, triode V10 will be cut off and its plate potential will rise to substantially the potential of battery B14.

The output of triode V10 is applied through a potential divider comprising resistors R41 and R42 to the grid of triode V11. As shown, one terminal of resistor R41 is connected to the plate of triode V10, the junction of resistors R41 and R42 is connected to the grid of triode V11, and the other end of resistor R42 is connected to the negative terminal of a battery B13, which has its positive terminal grounded, as shown. As will appear, when the potential at the plate of triode V10 rises to substantially the potential of battery B14, the potential at the grid of triode V11 will be high enough to cause substantial current to flow in triode V11. On the other hand, in the normal state of conduction of triode V10, with the plate potential substantially below that of the positive terminal of battery B14, there will be a negative bias on the grid of triode V11 which will cause it to be cut off.

The cathode of triode V11 is grounded. The plate is connected through the winding of relay VR and a resistor R43 in series to the positive terminal of battery B14. Accordingly, when triode V11 is conducting, relay VR will be energized and will close its front contacts. At other times, relay VR will be deenergized and will close its back contact. As shown, a capacitor C5 is provided which has one end grounded and the other end connected over the back point of contact $b$ of relay VR to the junction of a pair of resistors R44 and R45. These resistors are arranged in a potential divider circuit extending from ground through resistors R44 and R45 to the negative terminal of battery B13, which has its positive terminal grounded as shown. Accordingly, with relay VR released, capacitor C5 will be negatively charged to a value depending on the potential of battery B13 and the ratio of resistors R44 and R45. With relay VR energized, capacitor C5 is disconnected from its charging circuit and is directly connected to the grid of triode V10 over the front point of contact $b$ of relay VR. This provides a slowly decaying voltage at the grid of triode V10 which tends to maintain triode V10 cut off and triode V11 conducting to hold up relay VR for a fixed time after it has been energized, thus permitting the proper functioning of the external circuits controlled by relay VR.

The values of the components, in a practical embodiment of switching unit 20 above described, are, for resistor R40, 220K; for resistor R41, 2.2 megohms; for resistor R42, 3.3 megohms; for resistor R43, 10K; for resistor R44, 100K; for resistor R45, 47K; and for capacitor C5, .1 microfarad. Batteries B13 and B14 may each be 300 volts. Triodes V10 and V11 may be enclosed in a single 6201 envelope. Relay VR may be a style M miniature relay of the type manufactured by the Union Switch & Signal Division of Westinghouse Air Brake Company.

Switching unit 20 includes a third source of potential comprising a battery B12, which has its negative terminal grounded, as shown, and its positive terminal connected to the heel of contact $a$ of relay VR. The front point of contact $a$ of relay VR is connected, as shown in FIGS. 1b and 1a, over the front point of contact $a$ of track relay 2TR and thence through the winding of storage relay H in electronic storage unit 18 to ground. Accordingly when relay VR is energized, if track section 2T is then unoccupied, relay H will be energized to complete the storage of information supplied to storage unit 18 as described above.

Time delay unit 9, negative limit detectors 13 and 16 and positive limit detectors 14 and 17 each have their output terminals $b$ connected to input terminal $a$ of time delay unit 19 as shown. As previously described, each of the terminals $b$ of these units has a first condition in which they are clamped to 300 volts and a second condition in which they are clamped to 150 volts. Accordingly, capacitor C4 will be charged to 300 volts if any of the other units is clamped to 300 volts, and will be charged to 150 volts if all of the other units 9, 13, 14, 16 and 17 are clamped to 150 volts. With capacitor C4 charge to 300 volts, at equilibrium, and with the constants given, a voltage of +18 volts (excluding the effects of grid current, which in practice would prevent the grid from going positive) will be applied to the grid of triode V10. When the last of units 9, 13, 14, 16 and 17 has been clamped to 150 volts, and after the time delay of .7 second required for capacitor C4 to discharge, the grid of triode V10 will be changed to approximately −61.5 volts. At this time, triode V10 will be cut off, triode V11 will become conducting and relay VR will pick up.

Each of units 9, 13, 14, 16 and 17 checks a specific characteristic of the signal generator output, and is only clamped to 150 volts when the characteristic is within the prescribed range. Accordingly, relay VR will pick up when and only when all of the prescribed characteristics of the signal have been checked.

The operation of this embodiment of my invention will now be described. First, it will be assumed that both track sections 1T and 2T are unoccupied and that track relays 1TR and 2TR of program unit 1 are energized as shown. With track relay 1TR picked up, the output of signal generator 5 is interrupted at the open back point of contact *a* of relay 1TR.

With relay 1TR picked up, the negative terminal of battery B3 is connected over the front point of contact *b* of relay 1TR to charge capacitor C1 in time delay unit 9. Capacitor C1 will accordingly charge to —100 volts, and triode V1 will be cut off. With triode V1 cut off, its plate will be a potential of 300 volts, and capacitor C4 in time delay unit 19 will be charged through diode D1 in time delay unit 9 until it is charged to 300 volts.

With the output of signal generator 5 interrupted, triode V3 in negative limit detector 13 will conduct normally, and output terminal *b* of detector 13 will be clamped to 150 volts minimum. Each of the other positive and negative detectors will be similarly clamped, since they are receiving no signal from the signal generator and accordingly are receiving no signal outside of their set limits. However, since the voltage across capacitor C4 is set to 300 volts by the action of time delay unit 9, none of the positive or negative limit detectors will have any effect on the circuit at this time.

With capacitor C4 charged to 300 volts, triode V10 will be conducting and triode will be cut off, causing relay VR to be released.

The absence of a signal at input terminal *a* of clamp 10 will cause the voltage at output terminal *b* of clamp 10 to assume its minimum value of 26 volts. This signal will be applied to input terminal *a* of storage unit 18, but the storage cannot be completed because the circuit for relay H is interrupted at the open front point of contact *a* of relay VR.

Differentiator 15, with no input applied to its terminal *a*, will develop fixed potentials at its output terminals *b* and *c* which are within the respective acceptable inputs for negative limit detector 16 and positive limit detector 17.

Next, let it be assumed that a cut of cars moving in the direction shown by the arrow enters section 1T and releases track relay 1TR. The radar velocity meter 6 will measure the speed of the cut and provide a signal which is differentiated in differentiator 7 and biased in bias unit 8 to provide an output signal at terminal *a* of signal generator 5 representing the rolling resistance of the cut. This signal will now be connected to units of the validity detector apparatus over back contact *a* of track relay 1TR, in a manner to be described.

With track relay 1TR released, the charging circuit for capacitor C1 in time delay unit 9 will be interrupted and capacitor C1 will begin to discharge through resistor R8. However, for three seconds after the interruption of the charging circuit for capacitor C1, sufficient charge will remain to keep the plate potential of triode V1 near 300 volts. Accordingly, capacitor C4 in time delay unit 19 cannot be discharged below 300 volts for at least this three-second interval. This interval is provided in order to insure an opportunity for the cut and the measuring equipment to stabilize in performance, since the measuring section is normally located on or near the hump in the classification yard and it takes a short time after the release of each cut for the cut to settle down to normal rolling behavior.

The signal from terminal *a* of signal generator 5 is now applied over back contact *a* of track relay 1TR to input terminals *a* of clamp 10, differentiator 15, negative limit detector 13, and positive limit detector 14.

Clamp 10 will now pass a signal to storage unit 18 in accordance with the output characteristics shown in FIG. 3. That is, if the signal generator output is below about 6 volts, 26 volts will be applied to terminal *a* of storage unit 18. If the output is above about 6 volts, a signal will be applied to terminal *a* of storage unit 18 corresponding to a rolling resistance which is approximately 80 percent of that measured.

Negative limit detector 13 and positive limit detector 14 will normally remain clamped at an output voltage of 150 volts. However, if the output of signal generator 5 goes below —6 volts, negative limit detector 13 will clamp its output terminal *b* to 300 volts minimum and prevent the discharge of capacitor C4. If the output of the signal generator exceeds 100 volts, positive limit detector 14 will operate to clamp its output terminal *b* to a minimum of 300 volts, which would also prevent the discharge of capacitor C4.

Differentiator 15 will now proceed to measure the rate of change of the signal from signal generator 5. The output at terminals *b* and *c* of differentiator 15 is applied to input terminals *a* of negative limit detector 16 and positive limit detector 17, respectively. Negative limit detector 16 will function at a voltage more negative than —16 volts, and positive limit detector 17 will function at a voltage more positive than +16 volts. These voltages correspond to a permissible rate range of + or —.4 pound per ton per second. Should the rate of change exceed these limits, one or the other of the limit detectors will clamp its output terminal to a minimum of 300 volts and prevent the discharge of capacitor C4 in time delay unit 19.

At the end of three seconds, capacitor C1 in time delay unit 9 will have discharged sufficiently so that output terminal *b* of time delay unit 9 will be clamped to a minimum of 150 volts. If none of the limit detectors have been actuated, capacitor C4 in time delay unit 19 can now begin to discharge from 300 volts to 150 volts. When this occurs, after approximately .7 second, the grid of triode V10 will be biased to —61.5 volts, causing triode V10 to cut off and triode V11 to conduct. Relay VR will now pick up. If it happens that one of the limit detectors has been actuated, such that capacitor C4 cannot discharge after time delay unit 9 has functioned, this discharge can still take place at any time after all of the limit detectors have been restored to normal and before track section 2T is occupied by the cut. Thus, relay VR will be operated .7 second after the expiration of the initial time delay plus any additional time it takes to restore all of the detectors to normal. If this occurs before track relay 2TR is released, relay H will be picked up over front contact *a* of relay VR and front contact *a* of track relay 2TR. The final value passed by clamp 10 will then be stored in storage unit 18.

While I have described one embodiment of my invention in detail, it will be apparent that many changes and modifications could be made without departing from the scope of my invention. Accordingly, I do not wish to be limited to the details shown, but only by the scope of the following claims.

Having thus described my invention, what I claim is:

1. Apparatus of the class described, comprising, in combination, programming means for timing a measuring interval and having a first actuated condition at the start of said interval and a second actuated condition at the end of said interval, time delay means actuated from a first condition to a second condition a predetermined interval after said time delay means is operated, means controlled by said programming means in its first actuated condition for operating said time delay means, measuring means for generating a signal in accordance with the value of a variable to be measured, signal storage means, and means controlled by said programming means in its first actuated condition and said time delay means in its second condition for storing the signal from said measuring means in said storage means.

2. In combination, signal generating means for producing a signal in accordance with the value of a variable to be measured, programming means actuable to a first condition to mark a measuring interval and to a second condition to mark a non-measuring interval, first time delay means actuated by said programming means in its first condition and changing from a first condition to a second condition a first predetermined time after said first time delay means is actuated, limit detecting means actuated by an applied signal from a first condition to a second condition when the value of the applied signal is beyond a predetermined range, means controlled by said programming means in its first condition for connecting said signal generating means to said limit detecting means, storage means for storing an applied signal when energized, means controlled by said programming means in its first condition for connecting said signal generating means to said storage means, switching means operatively connected to said storage means for energizing said storage means when actuated, second time delay means operatively connected to said switching means, and means controlled by said first time delay means in its second condition and said limit detecting means in its first condition for actuating said second time delay means, said second time delay means actuating said switching means a second predetermined time after said second time delay means is actuated.

3. In a classification yard, in combination, a stretch of track divided into first and second adjacent track sections, first and second occupancy detection means operatively connected to said first section and said second section, respectively, each detection means being actuated by a car occupying its associated section from a first condition to a second condition, car rolling resistance measuring means located adjacent said first section for producing a signal in accordance with the rolling resistance of a moving car occupying said first section, limit detecting means actuated from a first condition to a second condition by an applied signal having a magnitude beyond a predetermined range, storage means for storing an applied signal when actuated, means controlled by said first occupancy detecting means in its second condition for applying said rolling resistance signal to said limit detecting means and said storage means, and means controlled by said second occupancy detecting means in its first condition and said limit detecting means in its first condition for actuating said storage means.

4. A measuring system, comprising, in combination, a program unit for timing a measuring period and having a first contact opened during the measuring period and closed at other times, a second contact closed during the measuring period and opened at other times, and a third contact opened at the end of the measuring period, a signal generator for producing a signal in accordance with the value of a variable to be measured, storage means comprising an input circuit and storage completion means for interrupting said input circuit and storing a signal applied to said input circuit, means controlled by said second contact when closed for connecting said signal generator to the input circuit of said storage means, time delay means normally in a first condition and controlled by said first contact when opened for changing to a second condition after a first predetermined time delay period, limit detecting means controlled from a first condition to a second condition by an applied signal having a characteristic beyond a predetermined range, means controlled by said second contact when closed for connecting said signal generator to said limit detecting means, and second time delay means for actuating said storage completion means when said third contact is closed, said second time delay means being actuated when said first time delay means is in its second condition and said limit detecting means is in its first condition.

5. Apparatus of the class described, comprising, in combination, measuring means for generating a signal in accordance with the rolling resistance of a railway car, limit detecting means controlled by said measuring means and actuated to a first or a second condition according as said signal is within or without a predetermined range, time delay means actuated by a railway car approaching said measuring means and changing from a first condition to a second condition a predetermined interval after actuation, and storage means controlled by said limit detecting means in its first condition and said time delay means in its second condition for storing said signal.

6. Apparatus for evaluating rolling resistance measurements made on railway cars moving in a stretch of track, comprising, in combination, means for generating a signal in accordance with the rolling resistance of a car moving in said stretch, storage means for storing an applied signal when actuated, means for applying said signal to said storage means, means controlled by said signal for actuating said storage means when said signal is within prescribed limits, and means for delaying the actuation of said storage means a predetermined time after a car enters said stretch.

7. In a classification yard, in combination, a stretch of track divided into first and second adjacent track sections, first and second occupancy detection means each controlled from a first to a second condition by cars occupying said first and second sections, respectively, car rolling resistance measuring means located adjacent said first section for producing a signal in accordance with the rolling resistance of a moving car occupying said first section, first limit detecting means actuated from a first condition to a second condition by an applied signal having a magnitude beyond a predetermined range, second limit detecting means actuated from a first condition to a second condition by an applied signal having a rate of change beyond a predetermined range, storage means for storing an applied signal when actuated, means controlled by said first occupancy detecting means in its second condition for applying said rolling resistance signal to said first and second limit detecting means and said storage means, and means controlled by said second occupancy detecting means and said limit detecting means in their first conditions for actuating said storage means.

8. In a classification yard, in combination, a stretch of track divided into first and second adjacent track sections, first and second occupancy detecting means, associated with said first and said second section, respectively, and controlled from a first to a second condition by a car occupying the associated section, rolling resistance measuring means located adjacent said first section for producing a signal in accordance with the rolling resistance of a moving car occupying said first section, time delay means actuated by said first occupancy detecting means in its second condition and changing from a first condition to a second condition a predetermined interval after actuation, limit detecting means actuated from a first condition to a second condition by an applied signal having a magnitude beyond a predetermined range, storage means for storing an applied signal when actuated, means controlled by said first occupancy detecting means in its second condition for applying said rolling resistance signal to said limit detecting means and said storage means, and means controlled by said second occupancy detecting means and said limit detecting means in their first conditions and said time delay means in its second condition for actuating said storage means.

9. In a classification yard, in combination, a stretch of track divided into first and second adjacent track sections, first and second occupancy detecting means associated with said first and said second section, respectively, and controlled from a first to a second condition by a car occupying the associated section, rolling resistance measuring means located adjacent said first section for producing a signal in accordance with the rolling resistance of a moving car occupying said first section, time delay means actuated by said first occupancy detecting means in its second condition and changing from a first condition to a second condition a predetermined interval after actuation, first limit detecting means actuated from a first condition to a second condition by an applied signal having a magnitude beyond a predetermined range, second limit detecting means actuated from a first condition to a second condition by an applied signal having a rate of change beyond predetermined limits, storage means for storing an applied signal when actuated, means controlled by said first occupancy detecting means in its second condition for applying said rolling resistance signal to said limit detecting means and said storage means, and means controlled by said second occupancy detecting means and said limit detecting means in their first condition and said time delay means in its second condition for actuating said storage means.

10. Apparatus of the class described, comprising, in combination, a stretch of track divided into first and second adjacent track sections, first and second occupancy detecting means associated with said first and said second section, respectively, and controlled from a first to a second condition by a car occupying the associated section, measuring means located adjacent said first section for producing a signal in accordance with a characteristic of a moving car occupying said first section, time delay means actuated by said first occupancy detecting means in its second condition and changing from a first to a second condition a predetermined interval after actuation, limit detecting means actuated from a first condition to a second condition by an applied signal having a magnitude beyond a predetermined range, storage means for storing an applied signal when actuated, means controlled by said first occupancy detecting means in its second condition for applying said signal to said limit detecting means and said storage means, second time delay means responsive to actuation by changing from a first condition to a second condition a predetermined time interval after actuation, means by said first time delay means in its second condition and said limit detecting means in its first condition for actuating said second time delay means, and means controlled by said second occupancy detecting means in its first condition and said second time delay means in its second condition for actuating said storage means.

11. In a classification yard, in combination, a stretch of track divided into first and second adjacent track sections, first and second occupancy detecting means associated with said first and said second section, respectively, and controlled from a first to a second condition by a car occupying the associated section, rolling resistance measuring means located adjacent said first section for producing a signal in accordance with the rolling resistance of a moving car occupying said first section, a capacitor, a first charging circuit for said capacitor including a first diode, time delay means actuated by said first occupancy detecting means in its second condition for normally applying a first voltage to said first diode and then applying a second voltage to said first diode a predetermined interval after actuation, a second charging circuit for said capacitor including a second diode, limit detecting means normally applying a first voltage to said second diode and actuated to apply a second voltage to said second diode by an applied signal having a magnitude beyond a predetermined range, means controlled by said first occupancy detecting means in its second condition for applying said rolling resistance signal to said limit detecting means, a relay, and means controlled by said capacitor when charged to said second voltage for operating said relay.

References Cited in the file of this patent

UNITED STATES PATENTS

| | | |
|---|---|---|
| 2,721,258 | Freehafer | Oct. 18, 1955 |
| 2,817,076 | Graves | Dec. 17, 1957 |
| 2,839,681 | Schatz | June 17, 1958 |
| 2,846,522 | Brown | Aug. 5, 1958 |
| 2,891,144 | Yalich et al. | June 16, 1959 |
| 2,901,609 | Campbell | Aug. 25, 1959 |
| 2,915,623 | Hughson | Dec. 1, 1959 |
| 2,965,889 | Cook | Dec. 20, 1960 |
| 2,971,084 | Meshelevich et al. | Feb. 7, 1961 |